United States Patent [19]

Davis

[11] 3,906,433

[45] *Sept. 16, 1975

[54] MULTI-DIRECTIONAL SEISMIC EXPLORATION METHODS

[75] Inventor: J. Lee Davis, Ector, Tex.

[73] Assignee: Avance Oil & Gas Company, Inc., Midland, Tex.

[ * ] Notice: The portion of the term of this patent subsequent to July 17, 1990, has been disclaimed.

[22] Filed: July 2, 1973

[21] Appl. No.: 375,640

Related U.S. Application Data

[62] Division of Ser. No. 145,811, May 21, 1971, Pat. No. 3,746,122.

[52] U.S. Cl.................. 340/15.5 MC; 340/15.5 CP
[51] Int. Cl.².......................................... G01V 1/28
[58] Field of Search............. 340/15.5 MC, 15.5 CP

[56] References Cited
UNITED STATES PATENTS

| | | | |
|---|---|---|---|
| 3,327,287 | 6/1967 | Ball et al. | 340/15.5 MC |
| 3,731,270 | 5/1973 | Penhollow | 340/15.5 MC |
| 3,746,122 | 5/1971 | Davis | 340/15.5 MC |
| 3,793,620 | 2/1974 | Miller | 340/15.5 MC |

*Primary Examiner*—Maynard R. Wilbur
*Assistant Examiner*—H. A. Birmiel
*Attorney, Agent, or Firm*—Giles C. Clegg, Jr.

[57] ABSTRACT

A number of seismic detectors are located in a two-dimensional array on the surface of the earth, either on land or at sea. One or more seismic disturbances are produced in the vicinity of the seismic detectors at points located to produce sampling of various subsurface reflection points to form one or more two-dimensional areas of coverage. For each seismic disturbance, the subsurface reflections thereof received by the various seismic detectors are recorded. In some embodiments, the seismic disturbances are produced at points located to produce multi-directional sampling of each of various subsurface reflection points and recordings for different ones of the seismic disturbances are combined to produce stacked recordings wherein multi-directional reflections from common subsurface points are added.

1 Claim, 4 Drawing Figures

MULTI-DIRECTIONAL SEISMIC EXPLORATION METHODS

RELATIONSHIP TO CO-PENDING APPLICATION

This application is a division of my co-pending application Ser. No. 145,811, filed May 21, 1971, now U.S. Pat. No. 3,746,122 issued July 17, 1973 entitled "Multi-directional Seismic Exploration Methods."

BACKGROUND OF THE INVENTION

This invention relates to seismic exploration methods for determining the location and course of subsurface earth structures.

A common method of seismic exploration is carried out by locating a string of spaced seismic detectors along a straight line at the surface of the earth. A seismic source is located in line with the detectors and operated to produce a seismic disturbance. Such disturbance produces subsurface reflections which are received by the detectors and recorded for later analysis. The string of detectors is then picked up and relocated either along a second line running parallel to the first line or at a new location in line with the first line and the foregoing process repeated for the second location. This process is continued until the desired area has been surveyed. As is apparent, this process can become rather tedious and time consuming where a relatively large surface area of the earth is to be surveyed.

A known problem which exists in the seismic exploration art is that of distinguishing the desired subsurface earth structure reflection signals from various extraneous seismic vibrations which are also received by the detectors and which are commonly referred to as "noise." A known technique for minimizing such noise is commonly referred to as "stacking." Such stacking technique involves the use of multiple sources for obtaining multiple reflections from a common subsurface point. After appropriate processing, the individual recordings for the common subsurface point are combined to produce a composite record wherein the desired signal components are emphasized and the undesired noise components are minimized. This stacking technique is described in greater detail in U.S. Pat. No. 2,732,906, granted to W. H. Mayne on Jan. 31, 1956, and in U.S. Pat. No. 3,040,833, granted to H. L. Mendenhall and S. D. Elliott on June 26, 1962.

It is an object of the present invention to provide new and improved methods of seismic exploration for obtaining a greater amount of data concerning subsurface earth structures for a given expenditure of time and labor or conversely, for obtaining a given amount of data for a lesser expenditure of time and labor.

It is another object of the invention to provide new and improved seismic exploration methods for enabling a greater degree of stacking for a given expenditure of time and labor.

It is a further object of the invention to provide new and improved seismic exploration methods for obtaining better data concerning subsurface earth structures.

For a better understanding of the present invention, together with other and further objects and features thereof, reference is had to the following description taken in connection with the accompanying drawings, the scope of the invention being pointed out in the appended claims.

BRIEF DESCRIPTION OF THE DRAWINGS

Referring to the drawings.

DESCRIPTION OF THE ILLUSTRATED EMBODIMENTS

Figure 1:
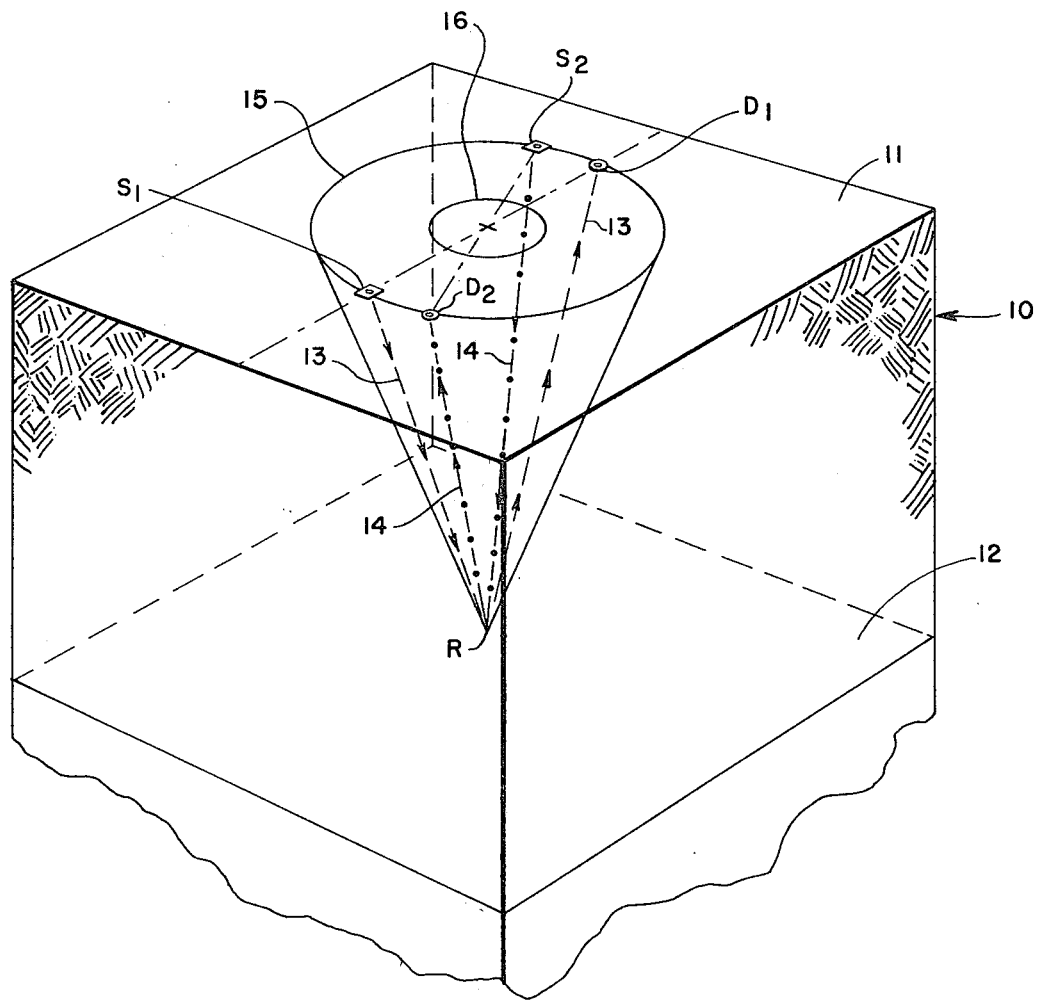
FIG. 1 is a perspective view of a volume of the earth and showing in a simplified manner one of the basic concepts of the present invention.

FIG. 1 shows a three-dimensional volume of earth structure 10, the surface of the earth being indicated at 11 and the upper surface of a subsurface earth strata being indicated at 12. In accordance with one embodiment of the invention, seismic sources $S_1$, $S_2$, etc. and seismic detectors $D_1$, $D_2$, etc. are located in a two-dimensional array at the earth's surface 11 for obtaining a multi-directional sampling of each of various subsurface reflection points, one of such points being indicated at R in FIG. 1. Reflection point R is located on the subsurface boundary plane 12. Seismic sources $S_1$, $S_2$, etc. are fired in a sequential manner to produce a time spaced series of seismic disturbances. For the subsurface point R, the seismic disturbance produced by source $S_1$ produces a seismic energy ray path 13 such that the reflection from the point R is received by the seismic detector $D_1$. Similarly, a portion of the energy produced by the seismic disturbance produced by source $S_2$ follows ray path 14 and is received by seismic detector $D_2$. The seismic disturbances received by each of the various detectors $D_1$, $D_2$, etc. are recorded by the usual type of signal recording apparatus (not shown), such apparatus being connected to the various detectors by means appropriate signal conducting cables (not shown).

For each of the source-detector pairs shown in the idealized case of FIG. 1, the angle of incidence of the ray path is equal to the angle of reflection and the subsurface point R is located midway between the particular source and detector being considered. Additional source-detector pairs may be located on the circle 15 to produce additional samplings of the subsurface reflection point R along additional lines running in various additional compass directions. Similarly, further source-detector pairs can be located on opposite sides of additional circles, such as the circle 16, which are concentric with the circle 15. In this manner, there can be developed a solid cone of data regarding the subsurface reflection point R. One practical consequence of this is that during the subsequent analysis the various pieces of data can be examined and only those pieces which give the best results can be selected and used to provide the final analysis. Also, as will be seen shortly, the basic concept of FIG. 1 can be readily extended to obtain multi-directional sampling of a relatively large number of subsurface reflection points during one and the same operation.

Figure 2:
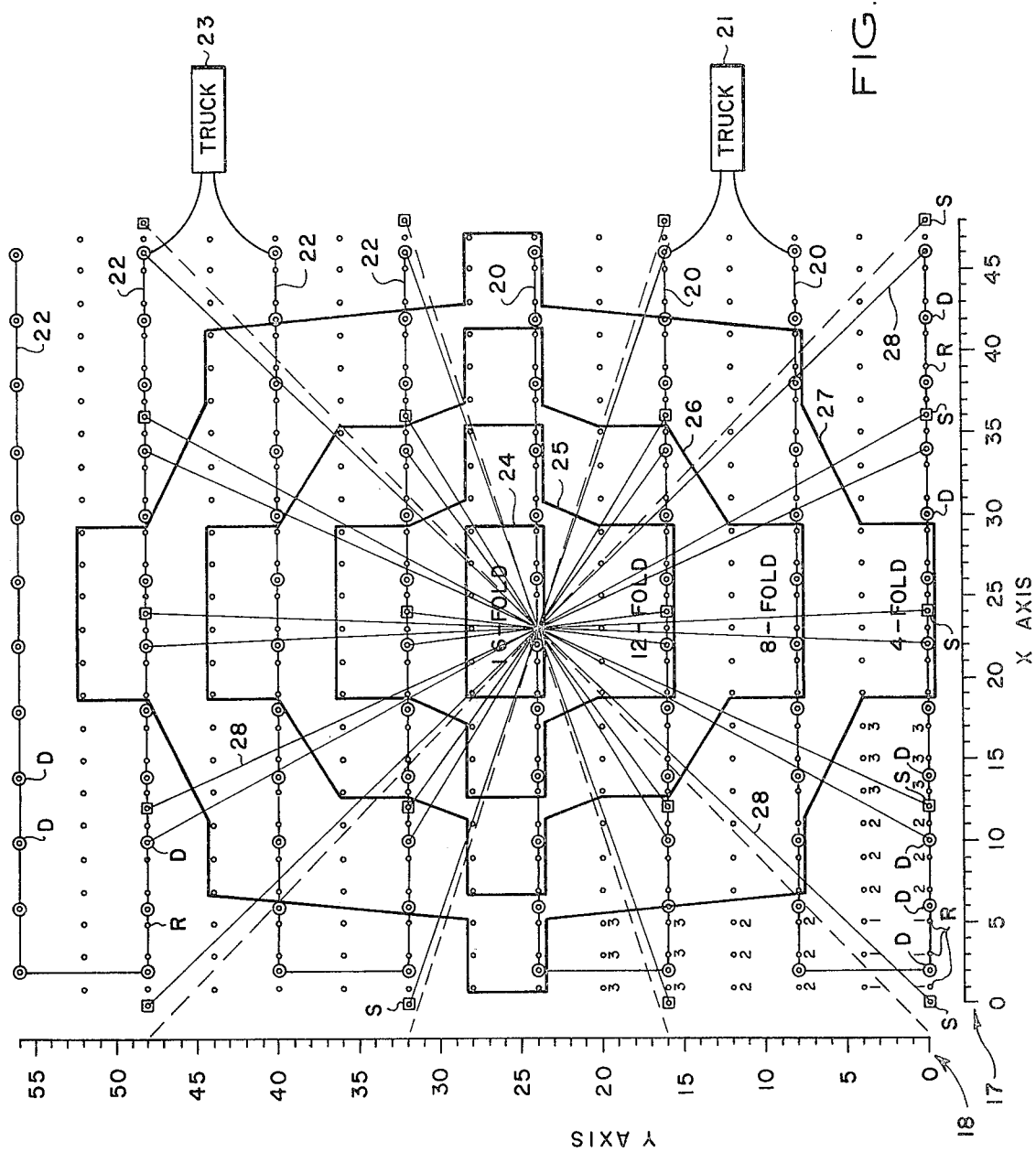
FIG. 2 is a plan view showing a two-dimensional layout of seismic sources and detectors on the surface of the earth in accordance with an areal embodiment of the invention.

Referring to FIG. 2, there is shown a plan view of a selected area on the surface of the earth. For accuracy of explanation, an imaginary X and Y coordinate system has been superimposed on the plan view of FIG. 1, the X axis scale of units being indicated at 17 and the Y axis scale of units being indicated at 18. For sake of example only, each distance unit on the X and Y scales may correspond to a physical distance of 110 feet, in which case the overall seismic array shown in FIG. 1 would cover an area of better than one square mile.

The seismic exploration system of FIG. 2 is an example of the manner in which the multi-directional sampling technique of FIG. 1 can be applied to a relatively large number of subsurface reflection points for purposes of providing a two-dimensional coverage of a relatively large area.

The seismic array of FIG. 2 includes a relatively large number of seismic sources S and a relatively large number of seismic detectors D located in a two-dimensional array covering a substantial surface area of the earth. Each of the sources S is represented by a small square with a dot in the center thereof, while each of the detectors D is represented by a small circle with a dot in the center thereof. The various subsurface reflection points R which are sampled are represented by small dots. As thus seen, the FIG. 2 array includes four parallel lines along which are disposed both sources S and detectors D, these lines being located at $Y = 0$, $Y = 16$, $Y = 32$, and $Y = 48$ and extending parallel to the X axis. The FIG. 2 array also includes four additional lines along which only detectors D are disposed, these lines being located at $Y = 8$, $Y = 24$, $Y = 40$ and $Y = 56$ and extending parallel to the X axis.

In addition to being parallel, the various source-detector and detector only lines are spaced a substantial distance apart. As used in this specification and the appended claims, the term "substantial distance" denotes a distance of 100 feet or more. Preferably, the spacing between detector lines is greater than the spacing between neighboring detectors on the same line. In the illustrated embodiment, neighboring detectors on the same line are spaced four units apart, while adjacent detector lines are spaced 8 units apart. Neighboring sources S on the same line are spaced 12 units apart and are located at points which are different from the detector D locations.

The seismic sources S may be of the impulse type or of the vibratory type. The seismic detectors D may take the form of various ones of the different types of seismometers and geophones which are known in the seismic art. Also, it is to be understood that each detector D, while spoken of in the singular, may, in fact, comprise a number of detectors grouped together in a cluster surrounding the common detector point for purposes of discriminating against undesired horizontally propogated siesmic energy, this technique being known in the seismic art.

The detectors D in the lower four lines are connected to multiconductor cables 20 which are, in turn, connected to appropriate signal recording apparatus in a recording truck 21. Similarly, the detectors D in the upper four lines are connected to multiconductor cables 22 which are, in turn, connected to signal recording apparatus in a second recording truck 23. In both cases, the recording apparatus is preferably of the magnetic tape recording type.

Each of the 20 seismic sources S in FIG. 2 is caused to produce a seismic disturbance at a time which is different from the times at which the other sources S produce their disturbances. For each seismic disturbance, the resulting subsurface reflection signals which are produced by the 96 seismic detectors D are individually recorded on separate tracks on magnetic tape in the trucks 21 and 23. These field tapes are subsequently played back or reproduced in a coordinated manner for providing improved indications of the subsurface geology. This can be done in several different ways to accomplish several different purposes.

A particularly important purpose which can be accomplished with the FIG. 2 array is the "stacking" of reflections from common subsurface points for purposes of producing seismic records wherein the effect of seismic noise is minimized. The manner of combining the individual recordings or traces obtained for a given subsurface reflection point is pretty much the same as that employed in connection with the known stacking technique. Briefly, the individual field recordings for the given point are played back and processed in such a manner as to apply the customary elevation, weathering and normal moveout corrections thereto, the corrected traces being individually recorded on a second magnetic tape. The second tape is then played back and the individual corrected signals are combined to produce a single composite signal which is then recorded to provide a composite record wherein the reflections from the common subsurfacce point augment one another. At the same time, the undesired noise vibrations, which are of a more or less random character for the different directions, more or less cancel one another so as to minimize the net noise component in the final composite record. One form of magnetic recording apparatus suitable in a general sense for accomplishing this stacking process is described in the above-mentioned U.S. Pat. No. 3,040,833 to Mendenhall and Elliott, it being understood that a greater number of initial or input magnetic tape tracks and a somewhat different arrangement of switches would be required in the present case.

In the foregoing manner, there can be provided stacked composite traces for 312 of the 336 reflection points shown in FIG. 2, there being six points in each corner of the array for which only a single reflection is recorded. Assuming that maximum stacking is desired, the composite traces for the reflection points R located within the area bounded by imaginary boundary line 24 are obtained by combining 16 separate reflections or folds. Similarly, the composite traces for the reflection points R located within the area between imaginary boundary lines 24 and 25 are obtained by combining 12 individual reflections or folds. The composite traces for the reflection points R in the area between imaginary boundary lines 25 and 26 are obtained by combining 8 different reflections or folds. The composite traces for the reflection points R in the area between imaginary boundary lines 26 and 27 are obtained by combining 4 diffcrent reflections or folds. For the remainder of the reflection points R lying outside the imaginary boundary line 27, the number of reflections which are combined are indicated by the small numerals adjacent such points as shown for the case of the reflection points in the lower left-hand corner of the FIG. 2 array.

Considering for example the reflection point R located at X-Y coordinate point (23,24), there are 16 different source-detector pairs which produce and receive reflections from this point. The ray paths for these reflections are indicated by radial lines 28 passing through the point (23,24). For this point there is obtained one recorded reflection for each of the sources S except for the four right-hand sources located at coordinate points (48,0), (48,16), (48,32) and (48,48). Where maximum stacking is desired, the 16 individual reflection traces for the point (23,24) are individually corrected for elevation, weathering and normal moveout and the resulting corrected traces are added together to produce the single composite trace for the point (23,24).

Another important purpose which can be accomplished with an areal seismic array of the type shown in FIG. 2 is that it enables particular ones of the ray paths to be selected and displayed in a coordinated manner to provide improved indications of the subsurface geology. For example, where a fault crosses the area being surveyed, the ray paths which are interrupted by the fault provide poor data concerning the subsurface geology. On the other hand, the ray paths which run more or less parallel to the fault line and are not interrupted by same provide much better data concerning the subsurface geology. This, improved analysis can be obtained by selecting the latter type ray paths and reproducing same in a coordinated manner. The multi-directional aspect of the present embodiment makes possible such a selection of only the better data. This is accomplished by initially reproducing the various recorded reflections and studying same to obtain an approximate understanding of the peculiarities of the subsurface geology. Based upon this preliminary study, selected ones of the recorded reflections are thereafter reproduced in a coordinated manner for enabling an improved analysis of the subsurface earth structure.

In addition to selecting particular ray paths to eliminate poor data because of faults, particular ray paths can also be selected for other purposes. For example, particular ray paths may be selected to produce stacked records wherein the effect of changes in normal moveout is reduced. Also, particular ray paths may be selected having lengths of the appropriate values for minimizing undesired noise effects. Also, as a general proposition, the recorded reflections which are to be coordinated can be chosen to concentrate or focus maximum emphasis on places of particular interest.

Figure 3:
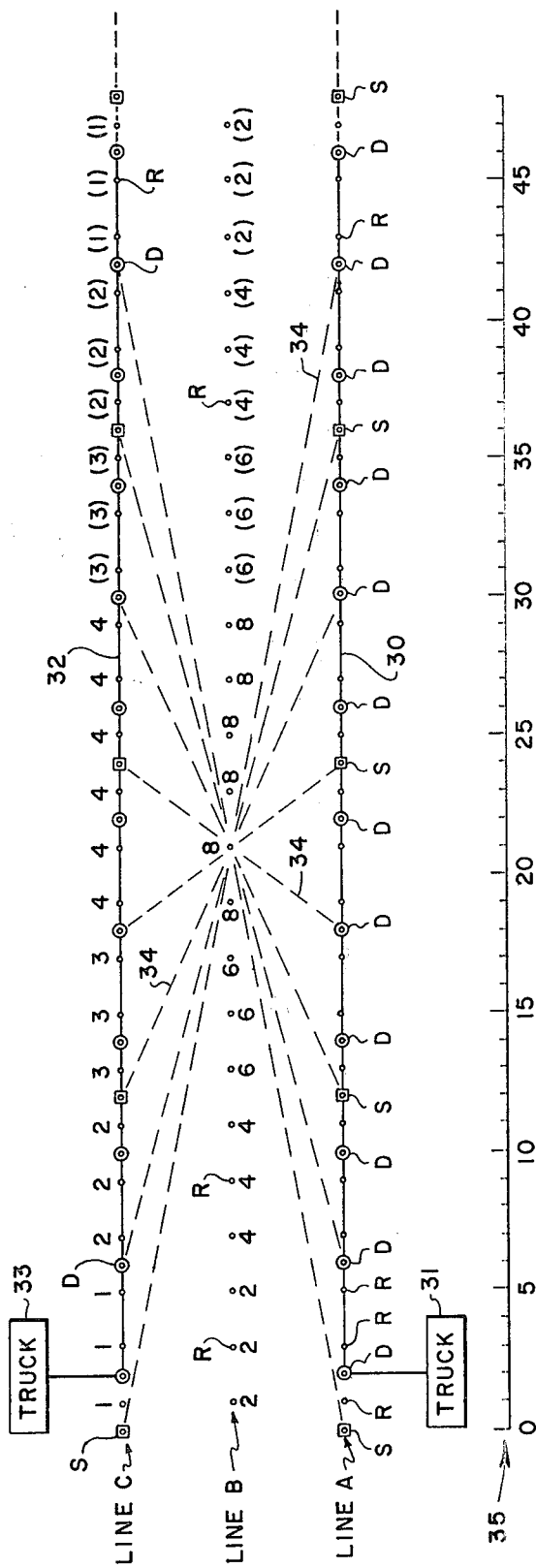
FIG. 3 is a plan view of a seismic source and detector layout in accordance with a lineal embodiment of the invention.

Referring to FIG. 3, there is shown a plan view of a seismic source and detector array as laid out on the surface of the earth in accordance with a lineal embodiment of the invention. The array of FIG. 3 includes a first set of spaced seismic detectors D located along a first line A and a second set of spaced seismic detectors D located along a second and different line C. Lines A and C are parallel and are spaced a substantial distance apart. The detectors D on line A are connected to a multiconductor cable 30 which runs to a recording truck 31, while the detectors D on line C are connected to a multi-conductor cable 32 which runs to a second recording truck 33.

In practicing the method of FIG. 3, seismic disturbances are produced in a sequential manner along line A at spaced source points S located at points different from the locations of the detectors D. In a similar manner, seismic disturbances are also produced in a sequential manner along line C at spaced source points S located at points different from the locations of detectors D. Using the imaginary distance scale 35 running parallel to the detector lines for purposes of explanation, a typical procedure would be to produce a seismic disturbance at the source point (A, 0), where A denotes the detector line and the numeral denotes the distance value on the imaginary scale. The resulting subsurface reflections received by each of the various detectors D in both lines A and C are individually recorded. After this first seismic disturbance subsides, a second siesmic disturbance is produced at source point (C, O) and the subsurface reflections thereof received by all of the seismic detectors D in both lines A and C are again individually recorded. Following this, the three seismic detectors D located at (A, 2), (A, 6) and (A, 10) are picked up and relocated in a spaced in-line manner to the right of the right-hand end of the cable 30. Similarly, the three detectors D located at (C, 2), (C, 6) and (C, 10), together with their interconnecting lengths of cable, are picked up and transferred to the right of the right-hand end of cable 32. Following this, a seismic disturbance is produced at source point (A, 12) and the resulting subsurface reflections received by all of the various seismic detectors D are recorded. Thereafter, a seismic disturbance is produced at source point (C, 12) and the resulting seismic reflections received by all of the detectors D are again individually recorded. Following this, the three left-hand most detectors in each of lines A and C are picked up and transferred to similar spaced positions to the right of the right-hand ends of cables 30 and 32. Seismic disturbances are then produced at the next pair of source points, the resulting reflection recorded and the next three sets of detectors in each line are picked up and transferred to the right-hand ends of the lines. In this manner, the detector lines are extended in a continuous manner until the desired length of the earth's surface has been surveyed.

The foregoing method represents another application of the multi-directional technique of the present invention. More particularly, there is obtained with this method an additional line of reflection points R lying along a line B located intermediate the detector lines A and C. As is indicated by the ray paths 34 passing through the reflection point R located at (B, 21), each point along line B is sampled in a multi-directional manner. Thus, in effect a solid cone of data is obtained regarding each such reflection point R along line B, (except, of course, for the few extreme left-hand points). Thus, not only does the present method yield a greater number of reflection points but, in addition, there can be obtained for the reflection points R along line B a greater degree of stacking than can be obtained along either of the single lines A and C. In particular, twice as many reflections are obtained for each of the reflection points along line B as are obtained for the corresponding ones of the reflection points along lines A and C.

The small numerals located adjacent the reflection points in lines B and C indicate the number of reflections or folds which can be stacked, it being noted that 8 different reflections can be stacked for the reflection point located at (B, 21), such reflections being represented by the different ray paths 34. The small numerals to the right of imaginary scale coordinate 30 are enclosed in parenthesis to show that they indicate the number of reflections obtained for the case where none of the detectors are picked up and moved from the left end to the right end of the array. Where the detectors are in fact picked up and moved in the manner previously described, there is obtained for each of the reflection points along lines A and C to the right of imaginary scale unit 30 a total of 4 reflection folds and for each of the reflection points along line B to the right of imaginary scale point 30 a total of 8 reflection folds, these totals remaining constant so long as the detectors continue to be picked up and transferred from left to right following each pair of seismic disturbances.

In accordance with a further feature of the present invention, both the areal method of FIG. 2 and the lineal method of FIG. 3 can be employed to provide a stacked shallow refraction survey. This is accomplished by reproducing in a coordinated manner the appropriately selected ones of the recorded reflections. The results of such refraction surveys can be used to determine the effects of refraction on the reflection survey data.

Figure 4:
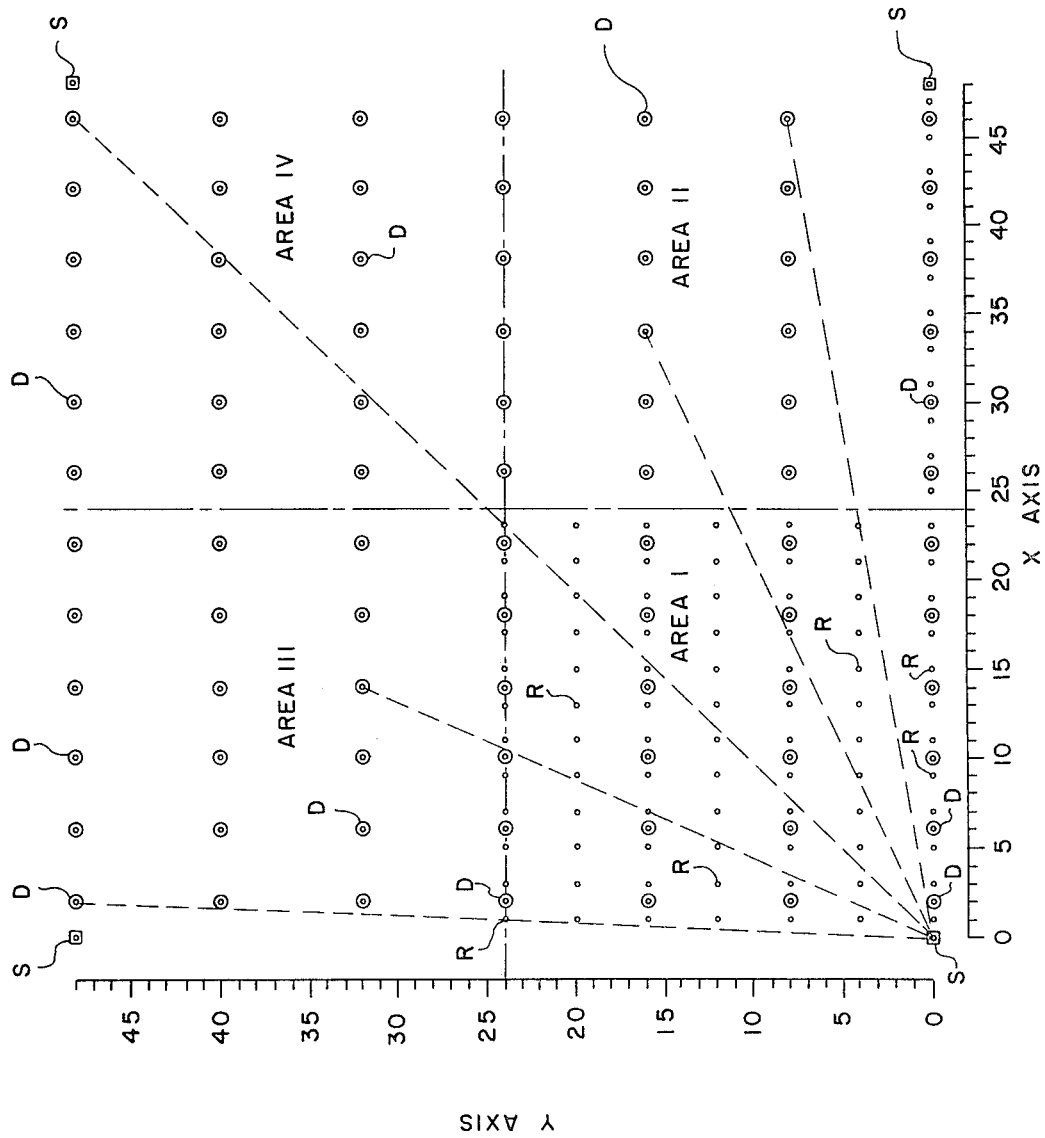
FIG. 4 is a plan view of an area of the earth's surface and showing a further layout of seismic sources and detectors in accordance with a further embodiment of the invention.

Referring now to FIG. 4, the seismic exploration system thereshown includes a relatively large number of seismic detectors D located in a two dimensional array covering a substantial surface area of the earth. Each of the detectors D is represented by a small circle with a dot in the center thereof. More particularly, the detector array of FIG. 4 includes a first set of twelve spaced seismic detectors D located along a first line running parallel to the X axis at the zero position on the Y axis scale. These detectors D are connected to a multi-conductor cable (not shown) which runs along the Y = 0 line and thence to a recording truck (not shown). The detector array further includes a second set of twelve spaced seismic detectors D located along a second and different line running parallel to the X axis and located at the Y = 8 position on the Y scale. Similarly, additional sets of spaced seismic detectors D are laid out parallel to the X axis at the 16, 24, 32, 40 and 48 unit positions on the Y axis scale. These various detector lines are parallel and are spaced a substantial distance apart.

The seismic array of FIG. 4 further includes a set of four seismic sources S, each located in the vicinity of the seismic detectors D. More particularly, each of the seismic sources S is located in the immediate vicinity of a different one of the four corners of the rectangular detector array, the coordinate locations for the sources being (0, 0), (48, 0), (0, 48) and (48, 48), where the first number denotes the X axis coordinate and the second number denotes the Y axis coordinate. As is seen from FIG. 4, each source S is represented by a small square having a circle in the middle thereof.

The seismic sources S are activated one at a time to produce their own individual seismic disturbances during different periods of time. Assuming that the seismic source S at location (0, 0) is activated first, then the resulting subsurface reflections received by each of the 84 seismic detectors D in FIG. 4 are individually recorded in the customary manner. This provides a comprehensive multi-point coverage of the subsurface region lying below the surface area designated as Area I in FIG. 4, this Area I quadrant being defined by coordinate points (0, 0), (0, 24), (24, 24) and (24, 0) The subsurface points from which reflections are obtained by the detectors are designated by the letter R and are represented by small black dots, a typical such dot being represented at the coordinate position (1, 0). As thus seen, there is one such subsurface reflection point R for each of the 84 detectors D in the total array. For the detector D located at (46, 48), for example, the subsurface reflection point R located at (23, 24) is investigated, such reflection point being midway between the source and the detector. Similarly, the subsurface reflections from the reflection point R at (7, 16) are received by the detector D at (14, 32). Thus, it is seen that by using a two-dimensional array of seismic detectors D, there is accomplished a multi-directional exploration of Area I by the single seismic source S located at (0, 0).

After the seismic disturbance produced by the source S at (0, 0) has died out, the seismic source S located at (48, 0) is activated to produce a second impulse type seismic disturbance. The subsurface reflections of this second disturbance are received by each of the 84 detectors in the total array and are individually recorded in the usual manner. This provides a comprehensive multi-point coverage of the subsurface region below Area II. In a similar manner, at subsequent points in time, the sources at (0, 48) and (48, 48) are detonated to provide comprehensive multi-point coverage of Areas III and IV, respectively.

From the foregoing, it is seen that the total area in FIG. 4 is comprehensively surveyed by the use of only four seismic source detonations. By way of comparison, if the conventional "one line at a time" technique had been used, a total of 14 source detonations (two per line) would have been required for this same number of detector lines. In addition, with the present multi-directional method, approximately twice as many subsurface points are surveyed as compared to the case of the conventional in-line "one line at a time" method. This is seen by observing that lines of reflection points also occur at Y coordinate values of 4, 12 and 20, these lines being located intermediate the detector lines. These intermediate reflection points would not be obtained with the conventional in-line method. Thus, a greater amount of data is obtained for a given expenditure of time and labor.

It is to be understood that the specific numbers and spacings of sources and detectors shown in the foregoing embodiments are intended by way of example only. The number of sources and number of detectors, for example, can be increased or decreased for purposes of covering a larger or smaller surface area, for purposes of increasing or decreasing the reflection point density or the like. The matter of primary importance is to arrange the sources and detectors so that reflections in different directions are simultaneously recorded. As indicated previously, this enables the obtaining of a greater amount of data and better quality data concerning the subsurface earth structures for a given expenditure of time and labor.

While the foregoing methods have been described with respect to their use on land, it is to be understood that such methods may also be used in water or water-covered areas such as oceans, bays, lakes, rivers, and the like.

While there have been described what are at present considered to be preferred embodiments of this invention, it will be obvious to those skilled in the art that various changes and modifications may be made therein without departing from the invention, and it is, therefore, intended to cover all such changes and modifications as fall within the true spirit and scope of the invention.

I claim:
1. In the art of evaluating geologic structures, a method for processing recorded seismic data to maximize geologically significant components and minimize meaningless noise components comprising:
   identifying recordings of data signals generated by seismic reflections received from a single reflecting point but whose respective incident and reflected signal components lie in vertical planes which are on azimuths differing from one another, said reflecting point being on a vertical lone which is the intersection of said planes;
   combining at least some of the so-identified recorded signals from different azimuths to produce a composite recorded signal wherein meaningless noise components of the individual recordings are largely self-cancelled by the combining, said composite recorded signal thereby being representative of said reflecting point;
   and displaying said composite recorded signal for evaluation in conjunction with other similarly processed composite recorded signals from other reflecting points.

* * * * *